United States Patent [19]

Yokoi et al.

[11] Patent Number: 4,589,659
[45] Date of Patent: May 20, 1986

[54] FOLDABLE LIQUID CRYSTAL DISPLAY UNIT

[75] Inventors: Gunpei Yokoi; Ichiro Shirai, both of Kyoto, Japan

[73] Assignee: Nintendo Co., Ltd., Kyoto, Japan

[21] Appl. No.: 632,709

[22] Filed: Jul. 20, 1984

[30] Foreign Application Priority Data

Aug. 1, 1983 [JP] Japan ............................ 58-141289
Aug. 1, 1983 [JP] Japan ........................ 58-120429[U]

[51] Int. Cl.$^4$ ............................................. A63F 9/00
[52] U.S. Cl. .............................. 273/1 GC; 273/85 G;
364/708; 340/705; 340/784; 40/365; 40/448;
40/571; 40/574
[58] Field of Search ............... 273/313, 1 GC, 1 E,
273/85 G, 237; 340/705, 784, 700, 702, 378.3,
378.4; 40/365, 363, 448, 571, 574, 615; 350/339
F, 334; 364/708

[56] References Cited

U.S. PATENT DOCUMENTS

| | | | |
|---|---|---|---|
| 4,398,723 | 8/1983 | Erickson et al. | 273/1 GC |
| 4,403,216 | 9/1983 | Yokoi | 273/1 GC |
| 4,424,967 | 1/1984 | Yokoi et al. | 273/1 GC |

*Primary Examiner*—Richard C. Pinkham
*Assistant Examiner*—MaryAnn Stoll Lastova
*Attorney, Agent, or Firm*—Larry A. Jackson

[57] ABSTRACT

A liquid crystal display unit (20) includes a main housing (21), a mirror housing (22) and a sub housing (23) which are successively connected with each other in a rotatable manner. The main housing (21) is provided on both sides with a pair of rearwardly extending arms (24 and 25), so that engaging projections (27) of the sub housing (23) are slidably engaged with sliding guide grooves (28) of the arms (24 and 25). Thus, the display unit (20) can be selectively brought into a folded condition in which the mirror housing (22) and the sub housing (23) are superposed along the arms (24 and 25) with the engaging projections (27) slid frontwardly and an opened condition in which the mirror housing (22) is downwardly inclined and the sub housing (23) is opened from the mirror housing (22). The sub housing (23) is provided with a liquid crystal display panel (38) adapted for transmission of light. In the opened condition, the light (D) transmitted from above through the liquid crystal display panel (38) is reflected forward by a mirror (31) provided on the mirror housing (22) for observation by a user holding the unit (20) with the upper surface of the panel upward and the surface of the mirror (21) forward.

18 Claims, 14 Drawing Figures

FOLDABLE LIQUID CRYSTAL DISPLAY UNIT

BACKGROUND OF THE INVENTION

1. Field of the Invention

The present invention relates to a liquid crystal display unit, and more particularly, it relates to a liquid crystal display unit suited for combination with a handy type electronic game device.

2. Description of the Prior Art

Figure 1:
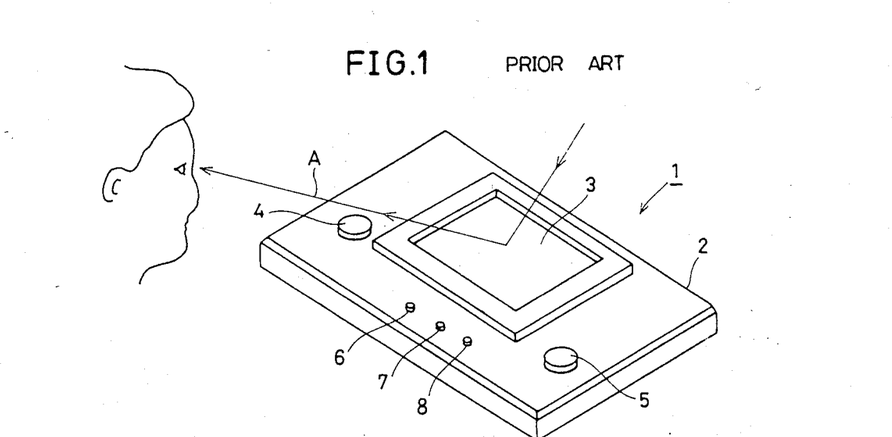
FIG. 1 is a perspective view of a handy type electronic game device shown as an example of a conventional liquid crystal display unit.

A liquid crystal display unit is applied, for example, to a handy type electronic game device. FIG. 1 is a perspective view showing a typical example of a conventional handy type electronic game device. In the drawing, a handy type electronic game device 1 comprises a housing 2 which is provided in a central portion of its upper face with a liquid crystal display panel 3. The housing 2 is further provided with game mode switches 6 to 8 for selecting game mode and character moving, and varying switches 4 and 5 for moving or varying predetermined characters displayed on the liquid crystal display panel 3 by the use of electronic circuitry to play a game.

The electronic game device 1 as shown in FIG. 1, is provided with a reflection panel to be in close contact with the lower surface of the liquid crystal display panel. Therefore, incident light from above the liquid crystal display panel 3 is reflected by the reflection panel provided under the same. Thus, the user of the game device 1 observes the display content displayed on the liquid crystal display panel 3 by the reflected light as shown by an arrow in FIG. 1.

However, since the display content is shown by the reflected light, the user observes the display content, i.e., the characters by way of shadows of the light. Thus, the display content might be indistinct depending on the circumambient lightness and the angle of view, and the characters cannot be clearly colored.

Therefore, the present applicant has already proposed a liquid crystal display unit, which has overcome the aforementioned disadvantages so that the display content can be readily observed and the characters can be clearly expressed in colors.

Figure 2:
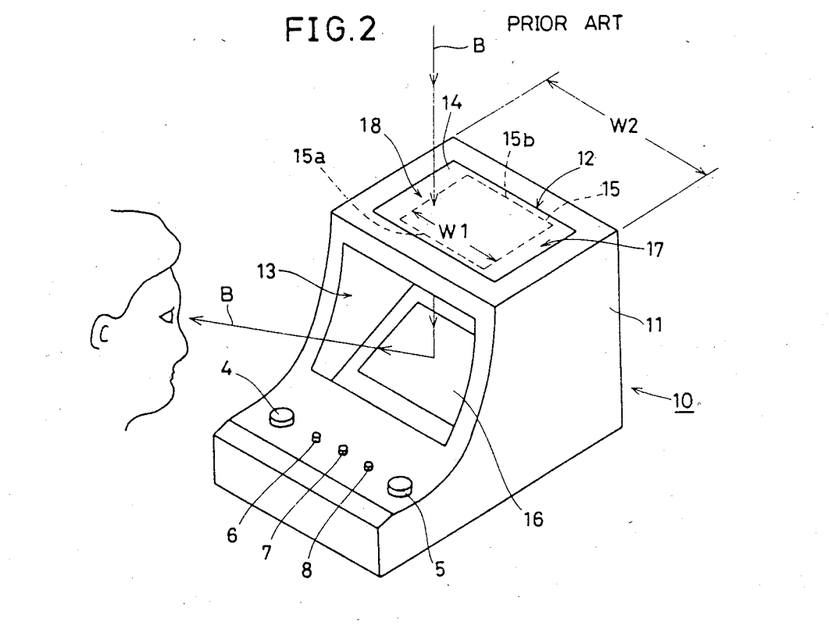
FIG. 2 is a perspective view of a desk type electronic game device shown as another example of a conventional liquid crystal display unit.

FIG. 2 shows an example of such a liquid crystal display unit already proposed by the present applicant, which is applied to a desk type electronic game device. Referring to FIG. 2, a desk type electronic game device 10 comprises a liquid crystal display panel 15 which is disposed in a substantially horizontal manner for facilitating transmission of the light from above and a mirror 16 provided in an oblique portion under the liquid crystal display panel 15 so as to reflect the light transmitted through the liquid crystal display panel 15 to a forward direction. A housing 11 of the desk type electronic game device 10 is provided on the top surface thereof with a light receiving window 12 for receiving the light from above and an opening 13 for showing the display content to the user in front of the device. The light receiving window 12 is fitted with a semitransparent member such as a frosted glass member 14, under which the liquid crystal display panel 15 is disposed as shown by the dotted line in FIG. 2 as directly not visible by provision of the frosted glass member 14. Further provided under the liquid crystal display panel 15 is the mirror 16, which is so arranged in a predetermined space that the surface thereof is inclined at a predetermined angle to face both the liquid crystal display panel 15 and the opening 13. Thus, the display content (characters) present on the liquid crystal display panel 15 is reflected on the mirror 16 by the light B transmitted through the liquid crystal display panel 15, to be observed by the user in front of the device through the liquid crystal display panel 15 and through the opening 13.

However, since such a liquid crystal display unit as shown in FIG. 2 is structured such that in which the light transmitted through the liquid crystal display panel 15 is reflected by the mirror 16 to be observed, the unit involves the following disadvantage. More specifically, the liquid crystal display panel 15 and the mirror 16 must be arranged at a predetermined angle, which requires a predetermined space defined therebetween and thus makes inevitably the entire device relatively large-sized. Therefore, although the liquid crystal display unit as shown in FIG. 2 is suited for combination with a desk type device such as the aforementioned desk type electronic game device, it is not suitable for combination with a handy type electronic game device.

In addition to the problem of the large size of the entire unit in external appearance, there is a further disadvantage with respect to the structure of connection with an internal electronic circuit. More specifically, the structure for connection between the liquid crystal display panel 15 and an electronic circuit for supplying electric signals thereto requires that the liquid crystal display panel 15 be provided on both sides 17 and 18 with spaces for containing connecting wires. As hereinabove described, the liquid crystal display panel 15 is so arranged as to transmit the light. Therefore, the above described connection structure further requires that a printed circuit connection to front and rear sides 15a and 15b of the liquid crystal display panel 15, particularly a printed circuit connection to the front side 15a be led to be connected to an electronic circuit arranged in, e.g., the lower portion within the housing 11 through the areas by the both sides 17 and 18 of the liquid crystal display panel 15 so as not to obstruct the light transmitted through the liquid crystal display panel 15. Thus, the housing 11 had to be structured with relatively large room for the both sides 17 and 18, such that the width $w_2$ of the entire housing 11 is considerably larger than the width $w_1$ of the liquid crystal display panel 15. Therefore, the entire unit is inevitably made large-sized also in this point of view, and the liquid crystal display unit could hardly be applied to a handy type device.

SUMMARY OF THE INVENTION

Object of the Invention

Accordingly, an essential object of the present invention is to provide a liquid crystal display unit implemented in a small size by foldable structure, in which a liquid crystal display content is reflected on a mirror.

Another aspect of the present invention is that there is provided a liquid crystal display unit in which electrical connection between a liquid crystal display panel and an electronic circuit is improved in structure, thereby to enable effective use of a liquid crystal display face.

Structure and Effects of the Invention

The present invention provides a foldable liquid crystal display unit which comprises a main housing, a mirror housing, a sub housing and a means for retaining these three housings, which are coupled so that the unit can be brought into a folded condition and an opened condition. To that end, the rear edge of the main housing is connected with the front edge of the mirror housing while the rear edge of the mirror housing is connected with the rear edge of the sub housing respectively in a rotatable manner. Further, the retaining means retains the housings in such a manner that the display unit is selectively brought into a folded condition in which the mirror housing and the sub housing are superposed with each other and an opened condition in which the mirror housing is downwardly inclined with respect to the main housing and the sub housing is opened at a predetermined angle with respect to the mirror housing. With such a structure the mirror housing is provided on its upper surface with a mirror and the sub housing retains a liquid crystal display means which is capable of transmitting light. When the display unit is in the opened condition, the light coming from above the sub housing is transmitted through the liquid crystal display means provided in the sub housing to be reflected by the mirror in the mirror housing, whereby the display content of the liquid crystal display means is reflected on the mirror to be observed. It is noted that in usual everyday life environment, the light mostly comes from above. The present invention makes effective use of such light.

Thus, according to the present invention, a liquid crystal display unit is implemented such that the liquid crystal display content is reflected on a mirror of foldable structure in which the display unit can be brought into a folded condition and an opened condition. That is, the liquid crystal display unit according to the present invention can be brought into an opened condition in which the liquid crystal display content is displayed on a mirror to be readily observed when the display unit is used, and the unit can also be brought in a folded condition for facilitating carriage or storing when the same is not in use.

In a preferred embodiment of the present invention, the retaining means comprises an arm and a guided member corresponding to the arm. A part of the arm is fixed to the main housing to rearwardly extend from either side of the rear edge of the main housing, which rear edge extends laterally between both sides of the main housing in the rear portion thereof. Further, the arm has a sliding guide member extending in the longitudinal direction thereof. The guided member is provided in one side surface of the sub housing corresponding to the arm, and is engaged with the sliding guide member of the arm to be slidingly guided by the same.

More preferably, a pair of arms having sliding guide members are provided while, in correspondence thereto, a pair of guided members are provided to be slidingly guided along the sliding guide members of the arms. In this case, the main housing, the mirror housing and the sub housing are respectively flatly formed, and the mirror housing and the sub housing are respectively made to have widths approximate to the space between the arms. Further, the housings are so designed that the thickness of the main housing approximates those of the mirror housing and the sub housing superposed with each other when the display unit is in the folded condition.

With such structure, the liquid crystal display unit according to the present invention can be smoothly brought from the folded condition into the opened condition and vice versa, and further, the display unit is thin and handy in the folded condition.

In accordance with the above described preferred embodiment of the present invention, the sub housing and the mirror housing are positioned respectively at predetermined angles with respect to the main housing when the main housing is retained in an angle to be readily operated by a user in the opened condition. More specifically, the sub housing is positioned substantially in a horizontal manner for facilitating transmission of the light from above, and the mirror housing is positioned in such an angle that its upper surface reflects the light transmitted through the sub housing so that the reflected light including the information of the display content as reflected on the mirror in the mirror housing is readily observed by the user in front of the unit. Thus, the main housing, the mirror housing and the sub housing are connected and retained in a correlated manner for each to be in most preferred angles, whereby the liquid crystal display unit is remarkably improved in convenience of use.

Another preferred embodiment of the present invention may comprise an application to an electronic game device. The device thus applied comprises an electronic circuit storing data signals for predetermined games. The device thus applied further comprises an operation means which is connected with the electronic circuit for supplying the same with signals. The electronic circuit is preferably contained in the mirror housing, while the operation means is preferably provided on the main housing. The electronic circuit may store only one game content, and preferably stores a plurality of game contents. Further, the electronic circuit may store data for displaying the time and other data in addition to the game contents. The operation means includes mode selection switches for selecting a desired game by changing the electric signal fed from the electronic circuit to the liquid crystal display means and a game execution switch for executing a game etc.

Flexible printed circuits are preferably used for electrically connecting the electronic circuit with the liquid crystal display means as well as with the operation means, thereby to smoothly carry out opening and closing operation of the display unit between the folded condition and the opened condition without any obstruction.

In a further preferred embodiment of the present invention, the liquid crystal display means is in a three-layer construction comprising a liquid crystal display panel, a transparent electrode panel and a color filter. The liquid crystal display panel is provided in a rectangular form and comprises liquid crystal display segments having in central portions thereof a plurality of patterns which are so driven by electric signals that transmission factors thereof are controlled, and front terminal electrodes and rear terminal electrodes which are electrically connected with the segments and provided in the vicinity of front and rear edges. The transparent electrode panel is also rectangularly formed similarly to the liquid crystal display panel, and is provided thereon with transparent electrodes. The transparent electrode panel is arranged in superposition with the liquid crystal display panel such that the transparent electrodes are electrically connected with the front terminal electrodes of the liquid crystal display panel, whereby the rear terminal electrodes of the liquid crystal display panel are directly connected with the electronic circuit while the front terminal electrodes are connected with the electronic circuit through the transparent electrodes.

Thus, there is no need to provide any space around the liquid crystal display panel for printed wires or lead wires for connecting the electronic circuit with the both terminal electrodes drawn out from opposite sides of the liquid crystal display panel, since one terminal electrode group can be guided toward the other terminal electrode group through the transparent electrodes superposed with the liquid crystal display panel. Consequently, the space for retaining the liquid crystal display panel can be effectively used so that the size of the liquid crystal display panel can be maximized with respect to the frame retaining the same.

A strip-shaped conductive rubber member is preferably interposed between the terminal electrodes and the transparent electrodes to connect the terminal electrodes and the transparent electrodes in a pressure contact manner. Since the terminal electrodes and the transparent electrodes are thereby electrically connected with each other in a detachable manner, no omission of the display content or error will be caused by bad contact. Further, the device can be easily disassembled for repairing.

Since the color filter is superposed on the display face of the liquid crystal display panel, the transmitted light can be selectively colored to enable color display.

The above and other objects, features, aspects and advantages of the present invention will become more apparent from the following detailed description of the present invention when taken in conjunction with the accompanying drawings.

BRIEF DESCRIPTION OF THE DRAWINGS

FIGS. 3 and 4 are illustrations showing a handy type electronic game device embodying a liquid crystal display unit according to the present invention, and more particularly.

DESCRIPTION OF THE PREFERRED EMBODIMENT

A preferred embodiment of the present invention is applied to a handy type electronic game device. Description is now made with respect to the preferred embodiment which is applied to the handy type electronic game device, with reference to the accompanying drawings.

Figure 3:
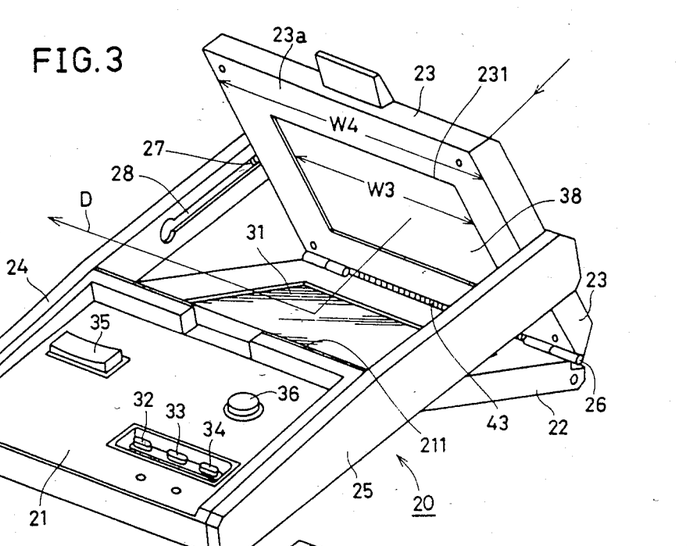
FIG. 3 is a perspective view showing the device in an opened condition and FIG. 4 is a perspective view showing the same in a folded condition.
Figure 4:
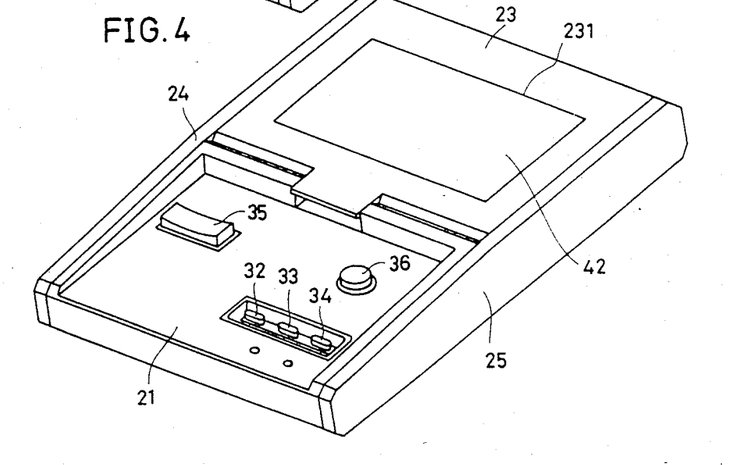
Figure 5:
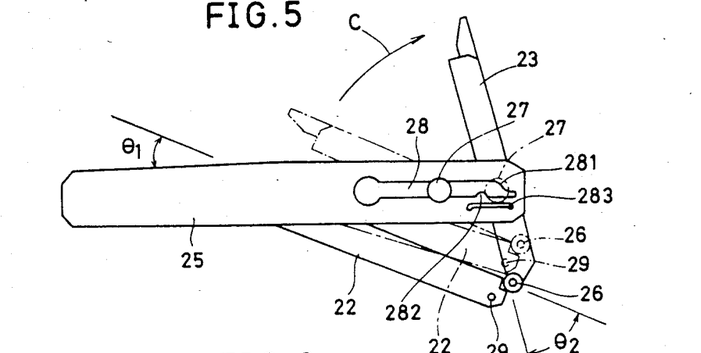
FIGS. 5 and 6 are side elevational views illustrating foldable structure of the preferred embodiment of the present invention as shown in FIGS. 3 and 4.
Figure 6:
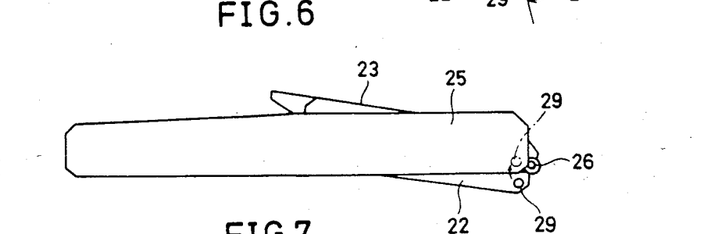

FIGS. 3 and 4 are external perspective views showing an embodiment of the present invention. More particularly, FIG. 3 is a perspective view showing a handy type electronic game device 20 in an opened condition, i.e., a condition in use, and FIG. 4 is a perspective view showing the same in a folded condition. Further, FIGS. 5 and 6 are right-hand side elevational views of the electronic game device 20 illustrating foldable structure thereof in which the electronic game device is brought from the opened condition as shown in FIG. 3 to the folded condition as shown in FIG. 4, or vice versa. The folding mechanism of the preferred embodiment is now described with reference to FIGS. 3 through 6.

First, mainly with reference to FIGS. 3 and 4, the electronic game device 20 includes a main housing 21, a mirror housing 22 and a sub housing 23. All of the main housing 21, the mirror housing 22 and the sub housing 23 are flat, and rectangularly formed in a plan view. The front edge of the mirror housing 22 is connected in a rotatable manner with the rear edge of the main housing 21. Further, the rear edge of the mirror housing 22 and the rear edge of the sub housing 23 are connected with each other by a roll pin 26 also in a rotatable manner.

On left and right sides of the main housing 21, a left arm 24 and a right arm 25 are fixed respectively. The left and right arms 24 and 25 extend toward the rear portion of the main housing 21 as shown in FIG. 3. In other words, substantially longitudinal halves of the left and right arms 24 and 25 are fixed to the left and right sides of the main housing 21, while the other halves extend toward the rear portion of the main housing 21. The mirror housing 22 and the sub housing 23 are arranged in a foldable manner in a U-shaped portion defined by the rear edge 211 of the main housing 21 and the left and right arms 24 and 25 extending toward the rear portion of the main housing 21.

The widths of the mirror housing 22 and the sub housing 23 are both selected to approximate the space between the left and right arms 24 and 25, that is, to be substantially equivalent to the width of the main housing 21. Further, the thicknesses of the respective housings 21, 22 and 23 are so selected that, when the mirror housing 22 and the sub housing 23 are superposed with each other, the thickness of the main housing 21 accords with those of the superposed housings 22 and 23.

On opposite side surfaces (inner side surfaces) of the left and right arms 24 and 25, there are formed sliding guide grooves 28 respectively extending in the longitudinal directions of the arms 24 and 25 as sliding guide members. In correspondence with these sliding guide members 28, the sub housing 23 is provided in the substantially central portions of its left and right side surfaces with engaging projections 27 as guided members. The engaging projections 27 are engaged in the sliding guide grooves 28 to move along the same.

Thus, the handy type electronic game device 20 can be freely brought into the opened condition as shown in FIG. 3 and the folded condition as shown in FIG. 4.

Description will now further be made mainly with reference to FIGS. 5 and 6. When the sub housing 23 is opened as shown by an arrow C, that is, the electronic game device 20 is brought into the opened condition, the engaging projection 27 moves along the sliding guide groove 28 in the right-hand direction as viewed in FIG. 5 with opening of the sub housing 23. When the sub housing 23 is fully opened as shown by the solid line in FIG. 5, the mirror housing 22 is positioned with respect to the main housing 21 in a state downwardly inclined at an angle $\theta_1$ while the sub housing 23 is positioned with respect to the mirror housing 22 in a state upwardly inclined at an angle $\theta_2$. At this time, the engaging projection 27 is positioned in the forward end portion 281 of the sliding guide groove 28.

The relation between the engaging projection 27 and the sliding guide groove 28 in this state is now described in detail. In immediate front of the forward end portion 281 of the sliding guide groove 28, there is provided a small projection 282. Further, substantially about the small projection 282, a small recess 283 is formed in parallel with the sliding guide groove 28. Therefore, the portion including the small projection 282 has elasticity in a direction intersecting the longitudinal direction of the sliding guide groove 28.

When the engaging projection 27 moves along the sliding guide groove 28 in the right-hand direction, as viewed in FIG. 5, the engaging projection 27 first comes in contact with the small projection 282. If the engaging projection 27 continues to further move in the right-hand direction, the small projection 282 is lowered by the aforementioned elasticity, whereby the engaging projection 27 moves to the forward end portion 281 of the sliding guide groove 28, and the small projection 282 is then restored to its original state by the subject elasticity. The engaging projection 27 stably remains in the forward end portion 281 of the sliding guide groove 28. When the engaging projection 27 is in such a state, the sub housing 23 is fully opened for use, that is, the electronic game device 20 is in the opened condition.

Even if the sub housing 23 threatens to be folded by its own weight in the opened condition, that is, even if the engaging projection 27 threatens to move back in the left-hand direction as viewed in FIG. 5 along the sliding guide groove 28, such movement of the engaging projection 27 is prevented by the small projection 282. Thus, the sub housing 23 is prevented from being automatically folded by its own weight.

It is to be noted that the circular portion in the left end of the sliding guide groove 28 as viewed in FIG. 5 is used for making the engaging projection 27 engaged in the sliding guide groove 28, and has no particular function after the engaging projection 27 is engaged with the sliding guide groove 28.

Description is now made with respect to a case where the electronic game device 20 is brought into the folded condition, that is, the sub housing 23 is folded as shown in FIG. 4. When force is applied to the sub housing 23 in a direction opposite to the arrow C, the small projection 282 is bent downwardly, whereby the engaging projection 27 moves in the left-hand direction along the sliding guide groove 28. Immediately before the sub housing 23 is folded, the device 20 is in the condition shown in FIG. 6. In this regard, a small projection 29 is formed in the rear end of at least one side surface of the mirror housing 22. Further, a concavity is provided in the inner surface of the arm 25 to be engaged with the small projection 29 when the sub housing 23 is completely folded. By virtue of this, when the sub housing 23 is folded, the small projection 29 is engaged with the subject concavity (not shown). Thus, the sub housing 23 is prevented from being automatically opened when the electronic game device 20 is carried in the folded condition. The small projection 29 is preferably capable of free projection and withdrawal, although it may be a continuously projecting one. If the housings, arms etc. of the electronic game device 20 are formed by plastic, for example, the small projection 29 will not cause any difficulty in opening and folding of the sub housing 23 since the plastic itself has somewhat elasticity.

It is to be noted that the small projection 29 is not necessarily provided in the mirror housing 22, and may be provided in the front end of the side surface of the sub housing 23.

Description will further be made with respect to the structure of the preferred embodiment with reference to FIGS. 3 and 4.

The sub housing 23 is assembled with components such as the liquid crystal display panel 38. Further, the sub housing 23 is provided with a large-sized window 231, which is fitted with a semitransparent member such as a soft and thin milk-white plate 42 for rendering the incident light even. Thus, the liquid crystal display panel 38 etc. assembled in the sub housing 23 can transmit the light downwardly from above the sub housing 23. It is noted that in usual everyday life environment the light mostly comes from above. The embodiment of the present invention is adapted to make effective use of such light from above. In the preferred embodiment of the present invention, as hereinafter described, the width $w_3$ of the window 231 can be made considerably large relative to the width $w_4$ of the sub housing 23.

A mirror 31 is mounted on the central main portion of the upper surface (the surface appearing in FIG. 3) of the mirror housing 22. The mirror 31 reflects the light transmitted through the sub housing 23 from above in the forward direction as shown by an arrow D in FIG. 3. Thus, the user in front of the unit observes the content displayed on the liquid crystal display panel 38 through the mirror 31.

The main housing 21 is provided on its upper surface with mode selection switches 32, 33 and 34 for selecting display contents such as a desired game type and the time, a character moving switch 35 for moving predetermined characters displayed on the liquid crystal display panel 38 and a character varying switch 36 for varying the characters. The user plays the game by operating the character moving switch 35 and the character varying switch 36.

When the handy type electronic game device 20 is in the opened condition, as mentioned above, the mirror housing 22 is positioned with respect to the main housing 21 downwardly inclined at the angle $\theta_1$ while the sub housing 23 is positioned with respect to the mirror housing 22 upwardly inclined at the angle $\theta_2$. Thus, when the user holds the left and right sides of the main housing 21 to facilitate operation of the respective switches 35 and 36 provided thereon, that is, when the main housing 21 is brought into an angle to be operated, the mirror housing 22 is positioned at an angle of approximately 45° to the user's view. In this manner, the display content reflected on the mirror 31 in the mirror housing 22 is most clearly seen by the user. At this time, the sub housing 23 is positioned in a substantially horizontal manner. As hereinabove described, the sub housing 23 retains the liquid crystal display panel 38 to facilitate transmission of the light from above. Since the light source as either case of the sunlight and an electric light is generally located above the electronic game device 20 in usual everyday life environment, as described previously, the sub housing 23 positioned substantially in a horizontal manner is in a condition most capable of transmitting the light coming from the light source. Therefore, a large amount of light is transmitted through the sub housing 23, whereby the liquid crystal display content is clearly reflected on the mirror 31 in proportion to the light amount.

As hereinabove described, according to the present embodiment, since the main housing 21, the mirror housing 22 and the sub housing 23 are so mutually related with each other that the respective housings are positioned at most desirable angles, convenience of use and operation efficiency of the electronic game device 20 are remarkably improved, while the content thereof is clearly displayed.

Specifically, the aforementioned angle $\theta_1$ is preferably within the range of 15° to 25° while the angle $\theta_2$ is preferably within the range of 50° to 60°.

Figure 7:
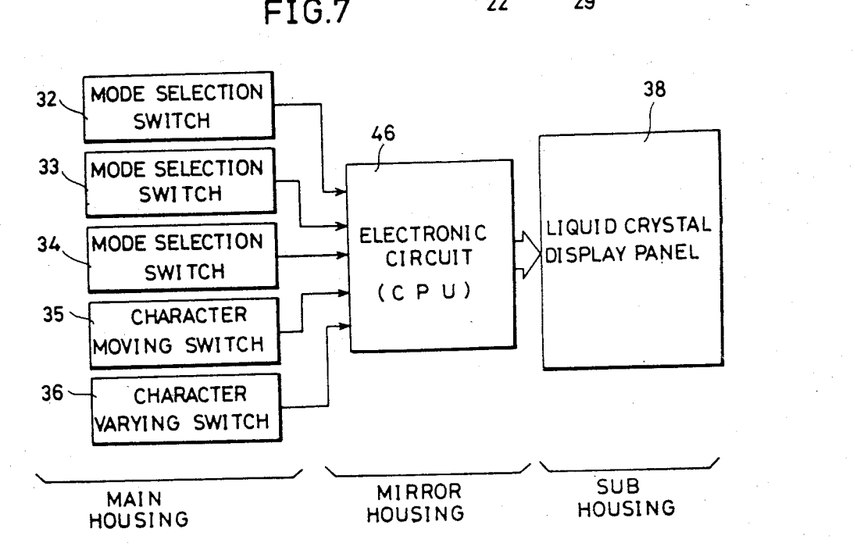
FIG. 7 is a block diagram showing structure of electrical connection of the preferred embodiment of the present invention.

FIG. 7 is a block diagram showing the electrical connection of the preferred embodiment. As shown in FIG. 7, the respective switches 32 to 36 provided in the main housing 21 are electrically connected with a predetermined electronic circuit 46 contained in the mirror housing 22, which includes, e.g., IC chips and LSI. The respective switches 32 to 36 supply the electronic circuit 46 with a game selection signal and a game execution signal etc.

The electronic circuit 46 stores data for displaying predetermined game contents and times. In the present embodiment, a plurality of game contents are stored in the electronic circuit 46, to be selected by the mode selection switch 32 or 33. Further, in response to a signal from the mode selection switch 34, the electronic circuit 46 supplies the liquid crystal display panel 38 with data for displaying the time.

The electronic circuit 46 arranged in the mirror housing 22 is connected with the liquid crystal display panel 38 which is assembled in the sub housing 23. Thus, the predetermined characters etc. for the game are displayed on the liquid crystal display panel 38 by electric signals from the electronic circuit 46.

Although the electronic circuit 46 is arranged in the mirror housing 22 in the present embodiment, it may be provided in the main housing 21.

Another feature of the present invention is directed to an improvement in the structure of connecting the electronic circuit 46 to the liquid crystal display panel 38 assembled in the sub housing 23. Description is now made in detail with respect to such a feature.

Figure 8:
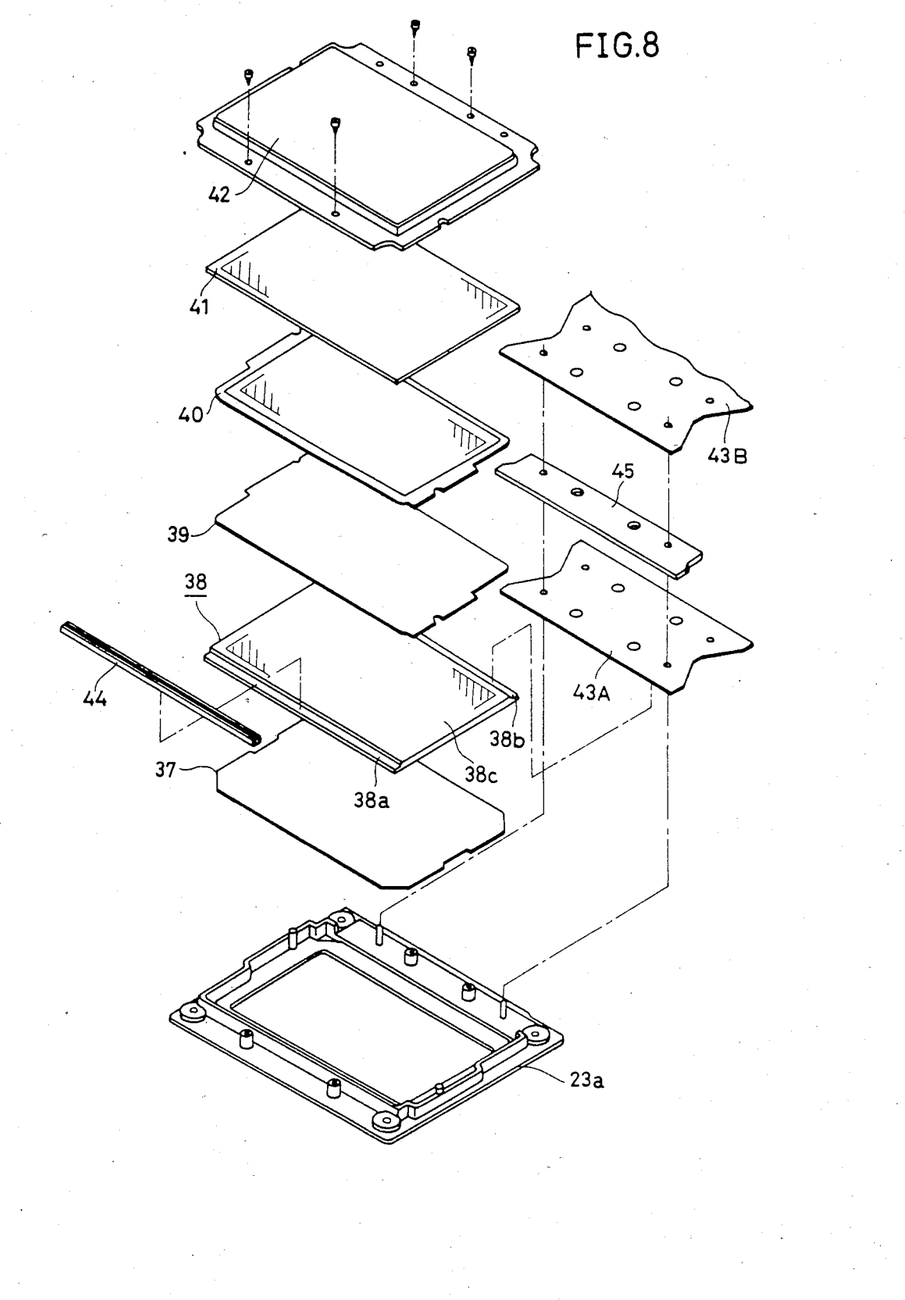
FIG. 8 is an exploded perspective view of components of a liquid crystal display means to be assembled in a sub housing 23.

FIG. 8 is an exploded view illustrating the respective components assembled in the sub housing 23. On a panel 23a forming the lower surface of the sub housing 23, there are assembled a polarization panel 37, the liquid crystal display panel 38, a polarization panel 39, a color filter 40, a transparent electrode panel 41 and the milk-white plate 42 in a laminated manner. The respective panels thus assembled are substantially rectangularly formed in plan view to be in conformity with the sub housing 23. The color filter 40 functions to selectively color the transmitted light, and is prepared by effecting light-transmittable coloring on, e.g., a plastic plate, thereby to color the display content reflected on the mirror 31. The milk-white plate 42 functions to make even the light transmitted through the liquid crystal display panel 38. Further, the polarization panels 37 and 39 are adapted to adjust the light transmitted through the liquid crystal display panel 38, thereby making the display content more clearly reflected on the mirror 31. The front edge of the liquid crystal display panel 38 and the corresponding front edge of the transparent electrode panel 41 thus assembled are electrically connected with each other by a conductive rubber connector 44. Further, the rear edge of the liquid crystal display panel 38 and the rear edge of the transparent electrode panel 41 are respectively connected with flexible printed circuits 43A and 43B for connecting the liquid crystal display panel 38 with the electronic circuit 46 (see FIG. 13). Preferably an elastic dummy connector 45 is interposed between the flexible printed circuits 43A and 43B, to facilitate more reliable connection.

It is to be noted that the front and rear edges of the liquid crystal display panel 38 are respectively stepped to be thin, so as to facilitate holding of the rubber connector 44 as hereinafter described and the aforementioned dummy connector 45.

Figure 9:
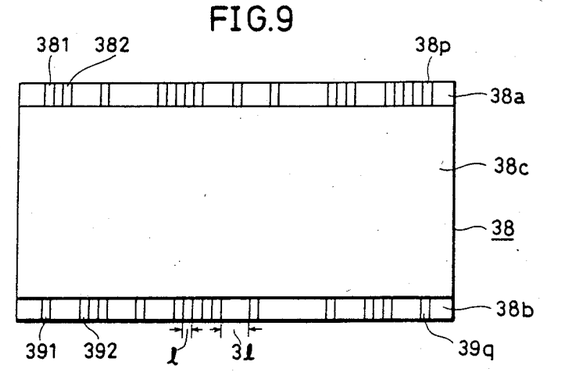
FIG. 9 is a plan view of a liquid crystal display panel 38 used in the preferred embodiment of the present invention.
Figure 10:
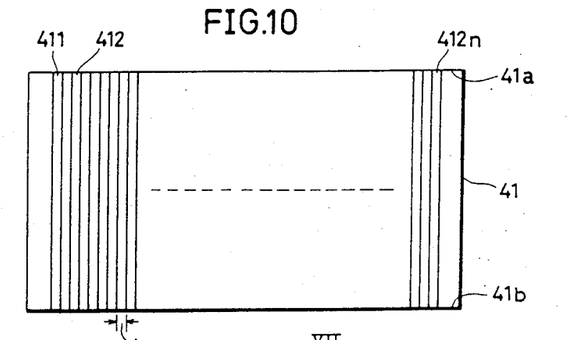
FIG. 10 is a plan view of a transparent electrode panel 41 used in the preferred embodiment of the present invention.

FIG. 9 is a plan view of the liquid crystal display panel 38, and FIG. 10 is a plan view of the transparent electrode panel 41. With reference to FIGS. 9 and 10, description is made in further detail with respect to the structure of connection, which is one of the features of the present embodiment.

Stepped portions 38a and 38b in the upper and lower sides (front and rear edges) of the liquid crystal display panel 38 are respectively provided with terminal electrodes 38l to 38p and 39l to 39q at predetermined intervals or at intervals by integral number times thereof. In the central portion 38c of the liquid crystal display panel 38, there are arranged display segments formed by liquid crystal (not shown) having a plurality of patterns, which are driven by electric signals to change transmission factors thereof. The liquid crystal display segments are connected with the respective terminal electrodes 38l to 38p and 39l to 39q, so that the transmission factors of the liquid crystal display segments are controlled by the electric signals fed from the terminal electrodes to display predetermined display patterns such as the characters.

Figures 11, 12:
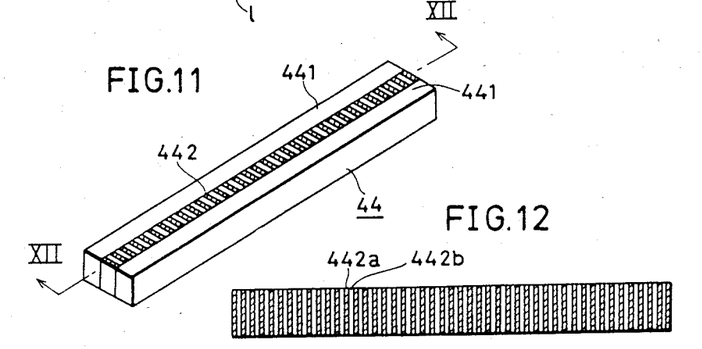
FIG. 11 is a perspective view of a conductive rubber connector used in the preferred embodiment of the present invention.
FIG. 12 is a cross-sectional view of the conductive rubber connector as shown in FIG. 11 taken along the line XII—XII.

FIG. 10 is a plan view of the transparent electrode panel 41. As shown in FIG. 10, the transparent electrode panel 41 is provided with a plurality of transparent electrodes 41l to 41n extending from its upper side (front edge) 41a to the lower side (rear edge) 41b thereof. The respective transparent electrodes 41l to 41n are provided at predetermined regular intervals. Therefore, when the transparent electrode panel 41 is superposed on the liquid crystal display panel 38 shown in FIG. 9, the terminal electrode, e.g., 38l in the upper side 38a of the liquid crystal display panel 38 and the transparent electrode 41l in the transparent electrode panel 41 are electrically connected and similarly the terminal electrode 382 and the transparent electrode 412 are electrically connected, and in a similar manner, other corresponding electrodes are electrically connected with each other. The rubber connector 44 as shown in FIG. 11 is inserted between the transparent electrode panel 41 and the liquid crystal display panel 38, i.e., the stepped portion 38a thereof, to electrically connect the panels 38 and 41 with each other.

Thus, the structure of connection in accordance with the preferred embodiment of the present invention is characterized in that the terminal electrodes 38l to 38p provided in the upper side (front edge) 38a of the liquid crystal display panel 38 are guided through the transparent electrodes 41l to 41n of the transparent electrode panel 41 superposed on the liquid crystal display panel 38 to the terminal electrodes 39l to 39q provided in the lower side (rear edge) 38b. With such structure, there is no need to provide printed circuits on, e.g., the left and right sides of the liquid crystal display panel 38 thereby to guide the terminal electrodes 38l to 38p in the upper side 38a to the lower side 38b for supplying the subject terminal electrodes 38l to 38p with electric signals, and thus no space is required on the left and right sides of the liquid crystal display panel 38 for containing printed wires.

In other words, the terminal electrodes of the liquid crystal display panel 38 are generally divided into a group of those provided in the upper side (front edge) 38a and a group of those in the lower side (rear edge) 38b, since they are of a large number. Therefore, when the terminal electrodes are to be connected with an electronic circuit etc., either group of terminal electrodes must be brought out toward the other group of terminal electrodes. In such a case, as hereinabove described with respect to the background of the invention, printed circuits generally have been provided on both sides of the liquid crystal display panel 38, thereby to bring out the terminal electrodes. Thus, there has heretofore been required provision of spaces on both sides of the liquid crystal display panel 38 for arranging such printed circuits.

However, according to the above described embodiment of the present invention, the transparent electrode panel 41 is utilized to bring out the terminal electrodes 38l to 38p provided in the upper side 38a of the liquid crystal display panel 38 toward the lower side 38b thereof, as hereinabove described. Thus, there is no need to provide printed circuits etc. on both sides of the liquid crystal display panel 38, whereby no additional space is required therefor.

Further, since the transparent electrode panel 41 is transparent as obvious from its name, transmission of the light through the liquid crystal display panel 38 is not obstructed by superposition of the transparent electrode panel 41 on the liquid crystal display panel 38.

FIG. 11 is a perspective view of the conductive rubber connector 44 interposed between the liquid crystal display panel 38 and the transparent electrode panel 41, and FIG. 12 is a cross-sectional view taken along the line XII—XII in FIG. 11. As shown in FIG. 11, the rubber connector 44 is in sandwich structure. Both side portions 441 thereof are formed by insulating rubber and its central portion 442 is formed by vertically alternately arranged conductive material portions 442a and insulating rubber portions 442b. Thus, the upper side of the rubber connector 44 is electrically connected with the lower side thereof through the conductive material portions 442a in the longitudinal direction, while the left and right sides thereof are insulated from each other. Therefore, no short circuit takes place between the respective terminal electrodes since the upper and lower surfaces of the rubber connector 44 electrically communicate with each other at portions located in corresponding surfaces while no communication is made at non-corresponding portions.

Figure 13:
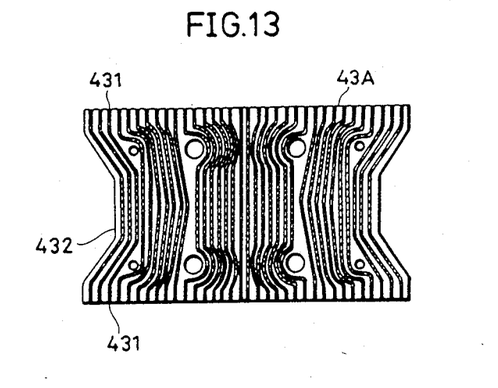
FIG. 13 is a plan view of a flexible printed circuit used in the preferred embodiment of the present invention.

FIG. 13 is a plan view of the flexible printed circuit 43A utilized for connecting the liquid crystal display panel 38 or the transparent electrode panel 41 with the electronic circuit 46. The flexible printed circuit 43A is formed by printing conductive portions 432 on, e.g., a polyester film. Excepting both end terminals 431, the conductive portions 432 are overcoated by an insulating coating agent for preventing a short circuit etc. caused by contact with external conductors etc.

By utilization of such a flexible printed circuit 43A, no electric wire is cut when the respective housings are folded as hereinabove described, and the folding of the housings is smoothly carried out.

Figure 14:
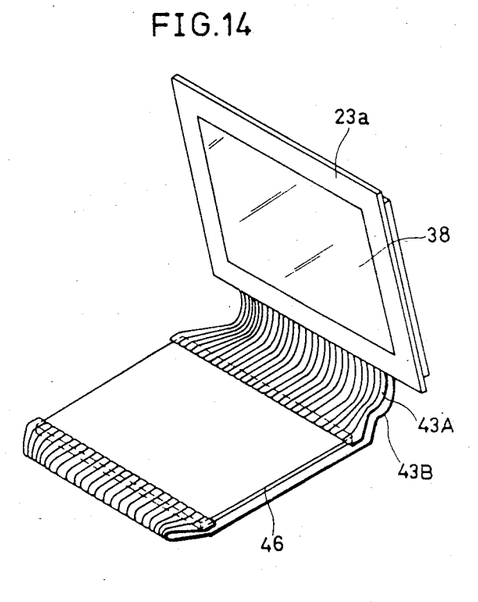
FIG. 14 is a perspective view showing a condition in which the liquid crystal display panel or the transparent electrode panel is connected with an electronic circuit by the flexible printed circuits.

In FIG. 14, there is shown a condition in which the flexible printed circuits are used to connect the liquid crystal display panel 38 as well as the transparent electrode panel 41 with the electronic circuit 46.

When the aforementioned transparent electrode panel 41 is constituted by transparent printed circuits integrally formed with the flexible printed circuits, connection with the electronic circuit 46 can advantageously be performed directly by the subject printed circuits.

Although the terminal electrodes of the liquid crystal display panel 38 and the transparent electrodes of the transparent electrode panel 41 are connected with each other by interposition of the conductive rubber connector 44 in a pressure contact manner, other electrical connection methods may be substituted therefor.

Further, although the above description of the preferred embodiment has been made with respect to a liquid crystal display unit applied to a handy type electronic game device, the liquid crystal display unit according to the present invention may also be combined, for example, with a small-sized electronic calculator, a liquid crystal television or a liquid crystal watch.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A foldable liquid crystal display unit capable of being in a folded condition and an opened condition, said liquid crystal display unit comprising:
    a main housing (21) having a rear edge laterally extending between both sides of the rear portion thereof;
    a mirror housing (22) having a front edge and a rear edge, each extending in the lateral direction, said front edge being rotatably connected with said rear edge of said main housing (21);
    a mirror (31) provided on said mirror housing (22);
    a sub housing (23) having a rear edge rearwardly positioned in said folded condition to extend in the lateral direction, said rear edge being rotatably connected with said rear edge of said mirror housing (22);
    liquid crystal display means (38) retained by said sub housing (23) to be capable of transmitting light; and
    means (24, 25, 26) for retaining said three housings for selectively bringing the same into a folded condition in which said mirror housing (22) and said sub housing (23) are positioned in a superposed manner, and an opened condition in which said mirror housing (22) is downwardly inclined with respect to said main housing (21) and said sub housing (23)

is positioned to be opened at a predetermined angle with respect to said mirror housing (22), whereby the light from above said sub housing (23) is transmitted through said liquid crystal display means (38) of said sub housing (23) to be reflected by said mirror (31) of said mirror housing (22) to enable observation of the content of said liquid crystal display means (38) in said opened condition.

2. A liquid crystal display unit in accordance with claim 1, wherein said retaining means comprises:
an arm partially fixed to said main housing (21) and having a sliding guide member (28) rearwardly extending from either one side of said rear edge of said main housing (21) in the longitudinal direction thereof; and
a guided member (27) provided in one side of said sub housing (23) corresponding to said arm to be slidingly guided by said sliding guide member (28) of said arm.

3. A liquid crystal display unit in accordance with claim 1, wherein said retaining means includes:
a pair of arms (24, 25) partially fixed to said main housing and having sliding guide members (28) rearwardly extending from both sides of said rear edge of said main housing (21) in the longitudinal direction thereof; and
a pair of guided members (27) provided on both sides of said sub housing (23) to be slidingly guided by said respective sliding guide members (28) of said pair of arms (24, 25).

4. A liquid crystal display unit in accordance with claim 3, wherein said mirror housing (22) and said sub housing (23) each have a width that substantially equals the space between said arms (24, 25).

5. A liquid crystal display unit in accordance with claim 4, wherein said main housing (21), said mirror housing (22) and said sub housing (23) are each rectangularly formed.

6. A liquid crystal display unit in accordance with claim 5, wherein the thickness of the main housing (21) substantially equals the combined thickness of said mirror housing (22) and said sub housing (23) superposed with each other in said folded condition.

7. A liquid crystal display unit in accordance with claim 6, wherein said liquid crystal display means (38) includes liquid crystal display segments having a plurality of patterns which are driven by electric signals so that transmission factors thereof are controlled.

8. A liquid crystal display unit in accordance with claim 7, wherein said liquid crystal display means (38) includes a color filter (40) superposed on its display face for selectively coloring the transmitted light.

9. A liquid crystal display unit in accordance with claim 8, wherein said patterns are representative of characters.

10. A liquid crystal display unit in accordance with claim 8, wherein said unit further includes an electronic circuit (46) for driving said display segments of said liquid crystal display means (38).

11. A liquid crystal display unit in accordance with claim 10, wherein said electronic circuit (46) stores signals for predetermined games.

12. A liquid crystal display unit in accordance with claim 11, wherein said unit further includes an operation means (32, 33, 34, 35, 36) connected with said electronic circuit (46) to supply said electronic circuit (46) with signals.

13. A liquid crystal display unit in accordance with claim 12, wherein said electronic circuit (46) stores signals for a plurality of games, and
said operation means includes mode selection switches (32, 33, 34) for selecting a desired game by changing said electrical signals fed from said electronic circuit (46) to said display segments and game execution switches (35, 36) for executing said game.

14. A liquid crystal display unit in accordance with claim 13, wherein said electronic circuit (46) is provided in said mirror housing (22), and
said operation means (32, 33, 34, 35, 36) is provided in said main housing (21).

15. A liquid crystal display unit in accordance with claim 13, wherein said display means includes:
liquid crystal display segments having in central portions thereof a plurality of patterns which are driven by electric signals so that transmission factors thereof are controlled;
a rectangular display panel (38) electrically connected with said segments, said display panel having front terminal electrodes and rear terminal electrodes provided in the vicinity of the front edge and the rear edge thereof; and
a transparent electrode panel (41) being in a rectangular form similar to said display panel (38) and including transparent electrodes,
said transparent electrode panel being arranged to be in superposition with said display panel so that said transparent electrodes are electrically connected with said front terminal electrodes provided in the vicinity of said front edge of said display panel,
whereby said rear terminal electrodes provided in the vicinity of said rear edge of said display panel are directly connected with said electronic circuit, and said front terminal electrodes provided in the vicinity of said front edge of said display panel are connected with said electronic circuit through said transparent electrode panel respectively.

16. A liquid crystal display unit in accordance with claim 15, wherein a strip-shaped conductive rubber member (44) is provided between said front terminal electrodes in the vicinity of said front edge of said display panel and said transparent electrodes,
whereby said display panel and said transparent electrode panel are brought into pressure contact with each other to electrically connect said front terminal electrodes and said transparent electrodes.

17. A liquid crystal display unit in accordance with claim 16, wherein said liquid crystal display means (38) includes a color filter (40) superposed with said display panel or said transparent electrode panel to selectively color the transmitted light.

18. A liquid crystal display unit in accordance with claim 10, wherein
said unit further includes an operation means (32, 33, 34, 35, 36) connected with said electronic circuit (46) to supply said electronic circuit (46) with signals.

* * * * *